United States Patent [19]

Nakamura et al.

[11] Patent Number: 5,895,532

[45] Date of Patent: Apr. 20, 1999

[54] PROCESS FOR TREATING THE SURFACE OF ALUMINUM SHEET FOR CAP MANUFACTURING

[75] Inventors: Mitsuru Nakamura; Kazuya Nakada; Hiroyuki Wada, all of Kanagawa-Ken, Japan

[73] Assignee: Henkel Corporation, Gulph Mills, Pa.

[21] Appl. No.: 08/776,477

[22] PCT Filed: Jul. 26, 1995

[86] PCT No.: PCT/US95/09135

§ 371 Date: Jan. 27, 1997

§ 102(e) Date: Jan. 27, 1997

[87] PCT Pub. No.: WO96/03534

PCT Pub. Date: Feb. 8, 1996

[30] Foreign Application Priority Data

Jul. 26, 1994 [JP] Japan .................... 6-173867

[51] Int. Cl.$^6$ .................... C23C 22/48
[52] U.S. Cl. .................... 148/247; 148/251; 148/273; 148/275
[58] Field of Search .................... 148/247, 251, 148/273, 275

[56] References Cited

U.S. PATENT DOCUMENTS 3,912,548  10/1975  Faigen .................... 148/247
4,141,868  2/1979   Emmons et al. .................... 260/23 AR
4,191,596  3/1980   Dollman et al. .................... 148/247
4,756,975  7/1988   Fujii et al. .................... 428/461
5,129,967  7/1992   Sander et al. .................... 148/247
5,158,622  10/1992  Reichgott et al. .................... 148/247

FOREIGN PATENT DOCUMENTS 0173300      3/1986   European Pat. Off. .
62-253674    11/1987  Japan .
2009753      6/1979   United Kingdom .

OTHER PUBLICATIONS

"Aruminiumu no kasei shori no genjou to kongo"[Current and Future Status of the Conversion Treatment of Aluminum] in *Nihon Paakaraijiaya Gihou* (*Nihon Parkerizing Technical Reports*) 1988, No. 1, pub. Jul. 3, 1988 (unavailable).

*Primary Examiner*—David A. Simmons
*Assistant Examiner*—Robert R. Koehler
*Attorney, Agent, or Firm*—Wayne C. Jaeschke; Norvell E. Wisdom, Jr.; Lance G. Johnson

[57] ABSTRACT

Aluminum or aluminum alloy sheet is treated with an aqueous composition containing: (a) acrylic polymers or copolymers with a glass transition temperature of no greater than 0° C., and (b) a water soluble zirconium compound, and dried. Preferably, the drying process is at an elevated temperature without intermediate rinsing. The coated aluminum/alloy surfaces exhibit corrosion resistance and paint adherence through a forming operation.

20 Claims, No Drawings

PROCESS FOR TREATING THE SURFACE OF ALUMINUM SHEET FOR CAP MANUFACTURING

FIELD OF THE INVENTION

This invention relates to a process for treating the surface of aluminum and aluminum alloy sheet, particularly sheet intended for the manufacture of caps (hereinafter referred to in some cases as aluminum cap stock sheet). More particularly, this invention relates to a process for treating the surface of aluminum cap stock sheet that forms thereon a polymer coating that is highly paint adherent even after the forming operation.

DESCRIPTION OF THE RELATED ART

In addition to having sufficient strength, aluminum cap stock sheet must generally have an excellent proccessability and workability, because of the deep-drawing operation used to form caps. Phosphate-chromate treatments have been executed on aluminum cap stock sheet with the objective of imparting thereto corrosion resistance and paint adherence. However, paint film adherence during the forming operation is inadequate when phosphate-chromate treatments are used by themselves, with the result that paint exfoliation can still occur.

As one example of art directed to solving this problem, Japanese Patent Publication Number Sho 54-18664 [18,664/1979] discloses a "waterborne composition for the treatment of metal surfaces". This invention is characterized by the use of a waterborne composition containing a water-soluble zirconium compound plus a water-soluble or water-dispersible resin (e.g., polyacrylic acid, etc.) as a paint undercoating treatment. Unfortunately, in the case of cap stock, which is subjected to a severe forming operation, the undercoating film provided by the described composition is unable to follow deformation of the material during the forming operation, with the result that the art in this invention again does not always prevent such phenomena as paint exfoliation.

Japanese Patent Application Laid Open [Kokai or Unexamined] Number Sho 62-253674 [253,474/1987] discloses a "waterborne composition for application as a paint undercoating treatment for aluminum and its alloys". This invention seeks to improve paint adherence through the addition of another essential component to the known composition of water-soluble zirconium compound+polyacrylic acid. This additional component consists of a water-soluble substance that contains the amino, amide, or imino group. However, the presence of said water-soluble substance containing the amino, amide, or imino group as an essential component of the undercoating treatment bath causes the treatment bath to have a short pot life and therefore greatly complicates the maintenance of stable film characteristics.

PROBLEMS TO BE SOLVED BY THE INVENTION

Thus, there has yet to appear a surface treatment process that provides the surface of aluminum cap stock with a treatment film that, after the forming operation, is strongly adherent to paint films applied on the aluminum or aluminum alloy stock and is also highly corrosion resistant. Moreover, such a process in which the treatment bath has a long pot life is also unknown.

Therefore, the present invention takes as its object the introduction of a process, for treating the surface of aluminum and aluminum alloys, which uses a waterborne composition in which the undercoating treatment bath is relatively stable during prolonged use and which provides corrosion resistance and paint adherence even after a forming operation such as is used for cap manufacturing.

SUMMARY OF THE INVENTION

The present inventors discovered that the aforementioned object could be accomplished by the formation of a polymer coating on the surface of aluminum sheet or aluminum alloy sheet by coating thereof with a liquid waterborne composition in which a water-soluble zirconium compound is combined with at least one selection from acrylic polymers and copolymers that have a glass-transition temperature no greater than 0° C., and by thereafter drying, preferably without any intermediate rinsing.

DETAILED DESCRIPTION OF THE INVENTION, INCLUDING PREFERRED EMBODIMENTS

Aluminum sheet, aluminum alloy sheet, and the like comprise the aluminum and aluminum alloy cap stock to which the present invention is directed. The aluminum alloy is specifically exemplified by aluminum-manganese-iron alloys, aluminum-iron-silicon alloys, aluminum-iron-magnesium alloys, and the like. Such aluminum and aluminum alloy stock may be subjected to the present invention after the preliminary execution thereon of a conventional phosphate-chromate treatment, zirconium conversion treatment, or the like, as described in the article entitled "Aruminiumu no kasei shori no genjou to kongo" [Title in English: "Current and Future Status of the Conversion Treatment of Aluminum"] in Nihon Paakaraijingu Gihou [Journal name in English: Nihon Parkerizing Technical Reports], 1988, No. 1, published on Jul. 3, 1988.

An essential aspect of the present invention consists of the use as a paint undercoating of a polymer coating, preferably crosslinked, that is composed of a water-soluble zirconium compound and at least 1 selection from acrylic polymers and copolymers that have a glass-transition temperature no greater than 0° C.

The acrylic polymer with a glass-transition temperature of 0° C. or less that is an essential component of the paint undercoating film according to the present invention can be a homopolymer of such polymerizable monomers as, for example, ethyl acrylate, isopropyl acrylate, 2-ethylhexyl acrylate, n-butyl acrylate, n-hexyl methacrylate, lauryl methacrylate, 2-hydroxyethyl acrylate, hydroxypropyl acrylate, and the like.

Acrylic copolymers with a glass-transition temperature of 0° C. or less may also be used as all or part of one essential component of the paint undercoating film according to the present invention. When a copolymer of two or more acrylic monomers is used in this invention, the degree(s) of polymerization of each acrylic monomer must be controlled in such a manner that the glass-transition temperature of the copolymer is 0° C. or less.

The homopolymers and copolymers to be used in the invention preferably have molecular weights in the range from 2,000 to 100,000 and more preferably in the range from 10,000 to 50,000.

Preferred examples of copolymers suitable for use according to the invention are copolymers of:
  (A.1) at least one acrylic monomer having in each molecule at least one moiety selected from the group consisting of carboxyl, hydroxyl, amide, and glycidyl; and (A.2) at least one acrylate ester monomer.

A preferred paint undercoating film is a crosslinked polymer film that comprises, preferably consists essentially of, or more preferably consists of, (A) an acrylic copolymer including residues from components (A.1) and (A.2) as described above and (B) a water-soluble zirconium compound.

Component (A.1) as described above is exemplified by such polymerizable monomers as acrylic acid, methacrylic acid, maleic acid, itaconic acid, 2-hy-droxyethyl methacrylate, hydroxypropyl methacrylate, acrylamide, N-methylol-acrylamide, diacetone acrylamide, and glycidyl methacrylate.

Acrylate ester monomer component (A.2) is exemplified by such polymerizable monomers as ethyl acrylate, isopropyl acrylate, 2-ethylhexyl acrylate, n-butyl acrylate, n-hexyl methacrylate, lauryl methacrylate, 2-hydroxyethyl acrylate, hydroxypropyl acrylate, and the like.

The discussion will now turn to the water-soluble zirconium compound(s) that are also an essential component of the treatment agent according to the present invention. Typical examples of subject water-soluble zirconium compounds are the alkali metal and ammonium zirconium carbonates, ammonium fluozirconate, zirconium acetate, zirconium nitrate, and zirconium sulfate. Also useable are any other water-soluble zirconium compounds that are able to deposit a zirconium compound on the surface of aluminum or aluminum alloy upon drying.

The acrylic polymer and/or copolymer is preferably used in the present invention at 0.5 to 2.0 weight parts per 1 weight part of the water-soluble zirconium compound. At less than 0.5 weight part of acrylic (co)polymer per 1 weight part of water-soluble zirconium compound, the polymer film is often unable to follow deformation of the material during the forming operation on the polymer film-coated aluminum or aluminum alloy; this can result in a reduced adherence in the worked region. At an amount in excess of 2.0 weight parts, the acrylic (co)polymer often does not exhibit an adequate water resistance, so that paint adherence will be reduced in some cases.

Water is the main component of the solvent/continuous phase for the paint undercoating treatment agent in the instant invention. However, a water-soluble organic solvent, such as an alcohol, ketone, monoether of a glycol, etc., may also be used at no more than 5 weight parts per 100 weight parts water for the purpose of adjusting the drying rate or improving the coatability.

The viscosity and solids concentration of the paint undercoating treatment agent of the instant invention preferably should be adjusted so as to provide, after application of the treatment agent to the surface of the aluminum or aluminum alloy and drying, a zirconium compound add-on of from 1 to 50 milligrams per square meter (hereinafter usually abbreviated as "mg/m$^2$"), measured as its stoichiometric equivalent as $ZrO_2$. The viscosity and solids concentration are preferably also selected so as to yield a uniform undercoating film. The particularly preferred range for the zirconium compound add-on is from 5 to 30 mg/m$^2$ as $ZrO_2$. Good adherence at the worked regions is not usually obtained with less than 1 mg/m$^2$ as $ZrO_2$ or with more than 50 mg/m$^2$ as $ZrO_2$.

The paint undercoating treatment agent used by the present invention can be applied to the surface of the aluminum cap stock sheet by any suitable coating technique (s) such as dipping, spraying, roll coating, flow coating, and the like. The drying process is also not critical, but the use of a hot air current of at least 110° C. for formation of the polymer film is preferred.

The various paints appropriate to the particular objective of protection or decoration can be applied on aluminum or aluminum alloy that has been subjected to a paint undercoating treatment according to the instant invention.

In order to obtain a relatively long pot life for a liquid treatment composition used according to this invention, the composition preferably does not contain any substantial amount of any water-soluble substance containing amino, amide, or imino moieties, except possibly for the acrylic copolymer itself.

The present invention will be explained in greater detail through the working and comparative examples provided below.

GENERAL PROCEDURES FOR THE EXAMPLES AND COMPARISON EXAMPLES

The sample material, process for forming the paint undercoating films and protective paint coatings, treatment process, and test process used were as described below, unless a specific exception is noted.

(1) Sample material

The cap stock consisted of JIS (Japanese Industrial Standard) type A-3105 aluminum sheets with a thickness of 0.25 millimeters (hereinafter usually deviated as "mm"), a width of 200 mm, and a length of 250 mm.

(2) Formation of the undercoating films

Table 1 reports the compositions of the treatment agents used in the working and comparative examples to form the undercoating films. The undercoating films were produced by using a roll coater to apply the undercoating treatment agent described in Table 1 onto the aforementioned aluminum sheet and then baking for 10 seconds in a 245° C. oven to form a film with the specified add-on mass.

TABLE 1

COMPOSITIONS OF THE TREATMENT AGENTS
USED TO FORM THE PAINT UNDERCOATING FILMS

| No. | Characteristics of Acrylic Component (A) Monomer(s) Used to Make | $T_g$ ° C. | Water-Soluble Zirconium Compound (B) | Ratio by Weight of Solids, (A)/(B) |
|---|---|---|---|---|
| | According to the Invention | | | |
| 1 | Hydroxypropylacrylate only | −7 | AZC | 1/1 |
| 2 | 2-Hydroxyethylacrylate only | −15 | Zirconium acetate | 1/1 |
| 3 | 95 Mole % of 2-HEA + 5 mole % of acrylic acid | −9 | Zirconium acetate | 1/1 |
| 4 | 70 Mole % of 2-HEA + 30 mole % of methacrylic acid | −20 | AZC | 1/1 |
| | Comparisons | | | |
| 5 | Acrylic acid only | 100 | AZC | 1/1 |
| 6 | Hydroxypropylacrylate only | −7 | None | N.a. |
| 7 | None | N.a. | AZC | N.a. |

Abbreviations for Table 1
$T_g$ = Glass transition temperature; AZC = ammonium zirconium carbonate; 2-HEA = 2-hydroxyethylacrylate; N.a. = Not applicable.

(3) Formation of the protective paint coating

An epoxy-phenol resin paint was used to produce the protective paint coatings. The protective paint coating was produced by using a roll coater to apply the epoxy-phenol resin paint over the paint undercoating film already formed on the aluminum sheet. This was followed by baking for 10 minutes at 180° C. to form a coating with a dry weight of 50 milligrams per square decimeter (hereinafter usually abbreviated as "mg/dm$^2$").

(4) Treatment conditions and process

Variations in the treatment conditions and process used in the working and comparative examples are reported in Table 2. In addition to the variations shown in Table 2, all substrates in all the working and comparative examples were subjected to the following non-varying treatments before the conversion treatment shown in Table 2: Degreasing by spraying for 5 seconds at 60° C. with FINECLEANER® 4377K, an alkaline degreaser commercially available from Nihon Parkerizing Company, Limited, and then water rinsing by spraying tap water for 20 seconds. Also, all substrates in all the examples and comparison examples were subjected to drying in a hot air current at 80° C. for 2 minutes after the pretreatment water rinse and before the application of the treatment agent shown in Table 2. Finally, all substrates in all the examples and comparison examples received the following treatments after the paint undercoating treatment shown in Table 2: Roll coating with epoxy-phenol paint and drying in a current of air at 180° C. for 10 minutes. The reference superscripts in Table 2 refer to the following: (*1) ALCHROM® K702, a chromium phosphate-based conversion treatment agent, commercially available from Nihon Parkerizing Company, Ltd., which was sprayed on the samples for 5 seconds at 50° C. and (*2) ALODINE® 404, a zirconium-based conversion treatment agent, commercially available from Nihon Parkerizing Company, Ltd., which was sprayed on the samples for 20 seconds at 40° C.

(5) Evaluation test process (5-1) Hot water resistance

For this test, the test sheet lacked the protective paint coating but had been processed up to and including the paint undercoating treatment. The test

TABLE 2

TREATMENT VARIATIONS FOR EXAMPLES 1–6 AND COMPARISON EXAMPLES 1–5

| No. | Pretreatment | | Paint Undercoating Treatment | | |
|-----|------|------|------|------|------|
| | Conv. Treat. | Water Rinse? | Treatment Agent Used | Hot Air Drying? | Zr Add-on, mg/M$^2$ |
| Ex 1 | None | No | 1 | Yes | 10 |
| Ex 2 | None | No | 2 | Yes | 10 |
| Ex 3 | (*1) | Yes | 1 | Yes | 10 |
| Ex 4 | (*1) | Yes | 3 | Yes | 10 |
| Ex 5 | (*1) | Yes | 4 | Yes | 10 |
| Ex 6 | (*2) | Yes | 1 | Yes | 10 |
| CE 1 | None | No | None | No | 0 |
| CE 2 | (*1) | Yes | None | No | 0 |
| CE 3 | (*1) | Yes | 5 | Yes | 10 |
| CE 4 | (*1) | Yes | 6 | Yes | 10 |
| CE 5 | (*1) | Yes | 7 | Yes | 0 |

Abbreviations for Table 2
No. = Number; Conv. Treat. = Conversion Treatment; mg/M$^2$ = milligrams per square meter; Ex = Working Example; CE = Comparison Example.
Other Notes for Table 2
The explanations of the meanings of the symbols in the column headed "Conv. Treat." are given in the main text. When a pretreatment water rinse was used, it was with tap water for 20 seconds. The numbers in the column headed "Treatment Agent Used" refer to the treatment agents identified by number in Table 1. When hot air drying was used as part of the paint undercoating treatment, it was with air at 245° C. for 10 seconds.

sheet was immersed in water at 95° C. for 20 minutes, and any changes in appearance were then noted and reported according to the following scale:

++=no change in appearance
+=slight whitening
×=distinct whitening (5-2) Corrosion resistance The test sheet for this test lacked the protective paint coating but had been processed up to and including the paint undercoating treatment. The test sheet was subjected to salt spray testing according to JIS Z-2731 for 300 hours, and the extent of white rust development was then scored according to the following scale:

++=area of rust development is less than 3%
+=area of rust development is from at least 3% up to but not including 30%
×=area of rust development is at least 30%

(5-3) Formability

The treated sheet was cut to give a disk with a diameter of 135 mm. This was subjected to a high-speed cylindrical deep-drawing test using a punch diameter of 60 mm, a blank holding pad pressure of 1.2 tons, and a deep-draw velocity of 30 meters/minute. Press oil (#640 from Nippon Kousakuyu) was applied at 2 grams per square meter for this operation. Then, to evaluate the formability, the thus-formed test specimen was placed in a laboratory high-pressure steam autoclave sterilizer (from Sanyo Denki) loaded with distilled water. The autoclave was run for 30 minutes after a temperature of 120° C. had been established. A peeling test was then carried out on a crosshatch pattern using cellophane tape (from Nichiban), and the results were reported on the following evaluation scale:

++=no peeling
+=peeling over less than 5% of the area
×=peeling over an area of at least 5%.

The results of these tests are shown in Table 3. These results make it clear that, by comparison with the undrawn state the undercoated cap stock of Comparative Example 3 had a better hot water resistance and corrosion resistance than the untreated sheet of Comparative Example 1 and the phosphate-chromate film bearing sheet of Comparative Example 2. However, Comparative Example 3 evidenced an unsatisfactory formability. In Comparative Example 4, in which the water-soluble zirconium compound was omitted from the undercoating film, both the hot water resistance and the formability were unsatisfactory.

TABLE 3

PERFORMANCE TEST RESULTS FOR EXAMPLES 1–6 AND COMPARISON EXAMPLES 1–5

| | Result of Evaluation for: | | |
|---|---|---|---|
| Number | Hot Water Resistance | Corrosion Resistance | Formability |
| Ex 1 | ++ | ++ | ++ |
| Ex 2 | ++ | ++ | ++ |
| Ex 3 | ++ | ++ | ++ |
| Ex 4 | ++ | ++ | ++ |
| Ex 5 | ++ | ++ | ++ |
| Ex 6 | ++ | ++ | ++ |
| CE 1 | × | × | × |
| CE 2 | + | ++ | + |
| CE 3 | + | ++ | + |
| CE 4 | + | + | + |
| CE 5 | + | + | + |

Abbreviations for Table 3
Ex = Working Example; CE = Comparison Example.

The performance was also inadequate in Comparative Example 5, which concerned the application of only the water-soluble zirconium compound.

In contrast to the preceding results, the undercoated stock prepared in Examples 1 to 6 according to the present invention had an excellent hot water resistance and corrosion resistance and also an excellent post-forming adherence.

The pot lives of some treatment bath compositions was measured by comparing the formability results achieved with the bath compositions immediately after mixing and then later after aging the same bath compositions at 40° C. for many days after mixing. The coated metal samples for testing the formability were prepared by the same procedures, before and after the treatment with the baths as shown in Table 4, as were used for Example 3 above, and the formability was measured as described above. Table 4 reports the treatment bath compositions used in these pot life tests and the results of these tests.

TABLE 4

COMPOSITIONS AND RESULTS FOR POT LIFE TESTING

| No. | Active Ingredients in Treatment Bath | | | Formability Test Results | | |
|---|---|---|---|---|---|---|
| | Acrylate Polymer or Copolymer | Zirconium Source | Third Component | Immediately After Mixing | After Aging at 40° C. for: | |
| | | | | | 10 Days | 30 Days |
| Ex 7 | HPA-Hom | ZA | None | ++ | ++ | ++ |
| Ex 8 | 2-HEA-Hom | ZA | None | ++ | ++ | ++ |
| Ex 9 | 1 MA/9 2-HEA | AZC | None | ++ | ++ | ++ |
| CE 6 | A-Hom | AZC | γ-APES | ++ | + | + |
| CE 7 | A-Hom | AZC | Urea resin | ++ | + | + |

Abbreviations for Table 4
No. = Number; HPA-Hom = hydroxypropyl acrylate homopolymer; ZA = zirconium acetate; 2-HEA-Hom = Homopolymer of 2-hydroxyethyl acrylate; 1 MA/9 2-HEA = copolymer of methacrylic acid and 2-hydroxyethyl acrylate in a weight ratio of 1:9; AZC = ammonium zirconium carbonate; A-Hom = acrylic acid homopolymer; γ-APES = gamma-aminopropylethoxysilane; Ex = Working Example; CE = Comparison Example.
Other Notes for Table 4
The amount of acrylate polymer was 5 g/L, and the amount of zirconium source was such as to give a stoichiometric equivalent of 5 g/L of $ZrO_2$, in every instance in Table 4. The amount of urea resin was 5 g/L and the amount of γ-APES was 0.8 g/L.

A third component was added in Comparative Examples 6 and 7 for the purpose of improving the adherence. However, the formability was observed to have deteriorated after even 10 days of aging at 40° C. in the case of Comparative Examples 6 and 7. In contrast to this, an excellent formability was obtained in Examples 7 to 9 according to the present invention even after aging for 30 days at 40° C.; this indicated an excellent pot life for compositions according to the invention. Thus a process according to the present invention for treating aluminum and aluminum alloy cap stock sheet can impart thereto a paint adherence that is excellent even after the forming operation. The invention composition is also stable and provides an excellent pot life.

The invention claim is:

1. A process for treating a surface of aluminum or aluminum alloy sheet, said process comprising steps of:

(I) covering the surface of the aluminum or aluminum alloy sheet with a liquid waterborne composition comprising:

(A) a component selected from the group consisting of acrylic polymers and copolymers that have a glass-transition temperature no greater than 0° C.; and (B) a component selected from the group consisting of water-soluble zirconium compounds; and (II) drying onto the aluminum or aluminum alloy surface at least part of the liquid waterborne composition coated thereon in step (I), so as to form an adherent polymer film on the aluminum or aluminum alloy surface.

2. A process according to claim 1, wherein component (A) is selected from the group consisting of copolymers of:

(A.1) at least one acrylic monomer having in each molecule at least one moiety selected from the group consisting of carboxyl, hydroxyl, amide, and glycidyl moieties; and (A.2) at least one acrylate ester monomer.

3. A process according to claim 2, wherein the ratio by weight of component (A) to component (B) in the liquid waterborne composition is from 0.5:1.0 to 2.0:1.0.

4. A process according to claim 3, wherein component (A) is selected from polymers and copolymers with a molecular weight in the range from 2,000 to 100,000.

5. A process according to claim 4, wherein component (A) is selected from polymers and copolymers with a molecular weight in the range from 10,000 to 50,000.

6. A process according to claim 5, wherein an amount of zirconium corresponding stoichiometrically to from 1 to 50 mg/m$^2$ of $ZrO_2$ is contained in the adherent polymer film present on the aluminum or aluminum alloy surface at the end of step (II).

7. A process according to claim 6, wherein an amount of zirconium corresponding stoichiometrically to from 5 to 30 mg/m$^2$ of $ZrO_2$ is contained in the adherent polymer film present on the aluminum or aluminum alloy surface at the end of step (II).

8. A process according to claim 4, wherein an amount of zirconium corresponding stoichiometrically to from 1 to 50 mg/m$^2$ of $ZrO_2$ is contained in the adherent polymer film present on the aluminum or aluminum alloy surface at the end of step (II).

9. A process according to claim 8, wherein an amount of zirconium corresponding stoichiometrically to from 5 to 30 mg/m$^2$ of $ZrO_2$ is contained in the adherent polymer film present on the aluminum or aluminum alloy surface at the end of step (II).

10. A process according to claim 3, wherein an amount of zirconium corresponding stoichiometrically to from 1 to 50 mg/m$^2$ of $ZrO_2$ is contained in the adherent polymer film present on the aluminum or aluminum alloy surface at the end of step (II).

11. A process according to claim 2, wherein an amount of zirconium corresponding stoichiometrically to from 1 to 50 mg/m$^2$ of $ZrO_2$ is contained in the adherent polymer film present on the aluminum or aluminum alloy surface at the end of step (II).

12. A process according to claim 1, wherein an amount of zirconium corresponding stoichiometrically to from 1 to 50 mg/m$^2$ of $ZrO_2$ is contained in the adherent polymer film present on the aluminum or aluminum alloy surface at the end of step (II).

13. A process according to claim 2, wherein component (A) is selected from polymers and copolymers with a molecular weight in the range from 2,000 to 100,000.

14. A process according to claim 1, wherein component (A) is selected from polymers and copolymers with a molecular weight in the range from 2,000 to 100,000.

15. A process according to claim 1, wherein the ratio by weight of component (A) to component (B) in the liquid waterborne composition is from 0.5:1.0 to 2.0:1.0.

16. A process according to claim 1 further comprising:

forming the film-bearing alloy surface by deep drawing.

17. A process according to claim 1 wherein component (A) is a polymer made from a monomer selected from the group consisting of ethyl acrylate, isopropyl acrylate, 2-ethyl hexyl acrylate, n-butyl acrylate, n-hexyl acrylate, lauryl methacrylate, 2-hydroxyethyl acrylate, and hydroxypropyl acrylate.

18. A process according to claim 1 wherein said polymer is selected from the group consisting of hydroxypropylacrylate homopolymer, 2-hydroxyethylacrylate homopolymer, copolymers of hydroxyethyacrylate and acrylic acid, and copolymers of hydroxyethyacrylate and methacrylic acid.

19. A process according to claim 1 wherein the drying step is at a temperature of at least 110° C.

20. A process according to claim 1 wherein the composition used in coating step does not contain any substantial amount of any water soluble substance containing amino, amide, or amino moieties.

* * * * *